May 10, 1949. H. E. BREMER 2,469,946
STOCK WATERING BOWL
Filed Sept. 28, 1944
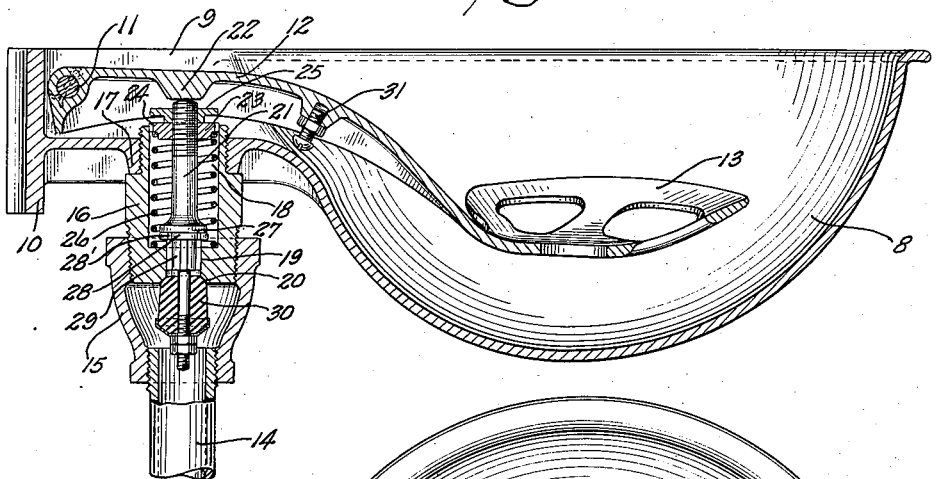
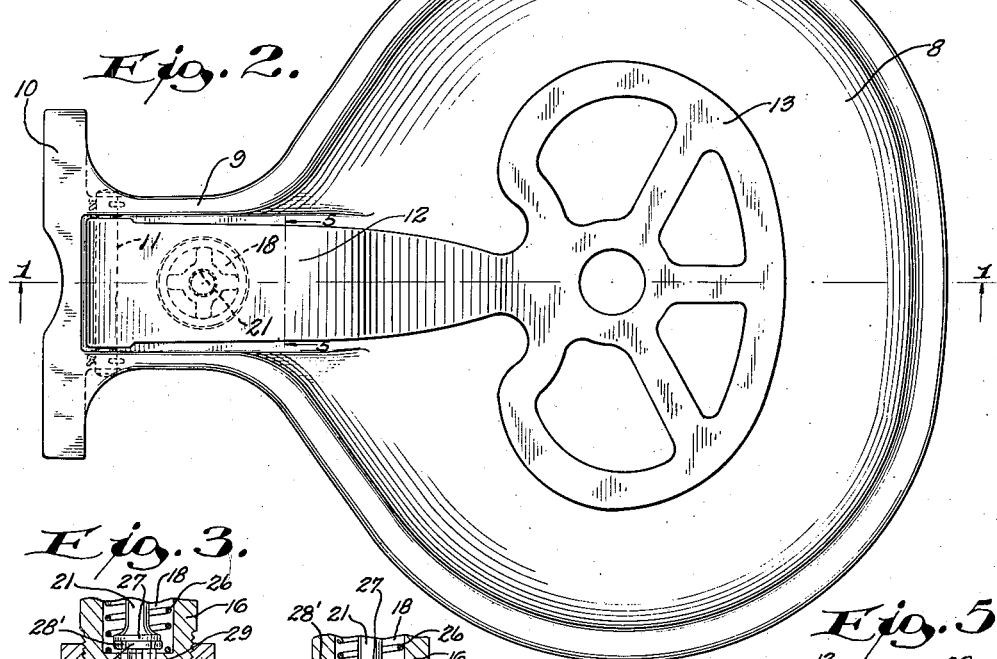
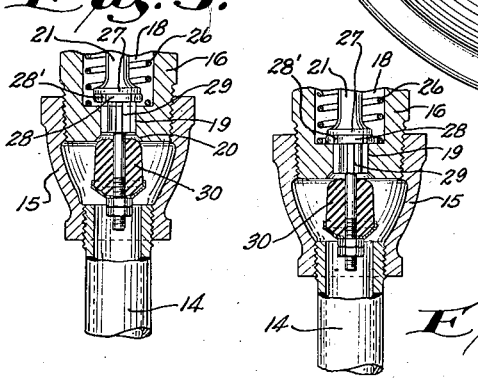
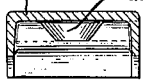
INVENTOR.
Harry E. Bremer,
BY Morsell & Morsell
ATTORNEYS Patented May 10, 1949

2,469,946

UNITED STATES PATENT OFFICE 2,469,946

STOCK WATERING BOWL

Harry E. Bremer, Milwaukee, Wis.

Application September 28, 1944, Serial No. 556,169

1 Claim. (Cl. 119—75)

This invention relates to improvements in stock watering bowls, and more particularly to a stock watering device which comprises a water bowl to which water is automatically supplied responsive to the engagement of an animal's nose with a valve controlling, pivotally mounted plate or lever.

A general object of the present invention is to provide a stock watering bowl of the class described providing for a more efficient control of water to the bowl, and which is regulatable to adapting the device to varying conditions and types of animals.

A further object of the invention is to provide a stock watering bowl wherein the water supply conduit to the bowl is equipped with a novel form of controllable valve, including spaced valve members cooperable with spaced valve ports to provide a controlled flow of water of a desired intensity to the bowl.

A further object of the invention is to provide a stock watering bowl wherein an undersurface of the valve operating nose plate is formed with channels and baffles for directing the flow of water into the bowl without splashing.

A further object of the invention is to provide a stock watering bowl having easily manipulatable regulating means to provide for any desired type of water flow into the bowl, from a small trickle to a full stream.

A further object of the invention is to provide a stock watering bowl wherein water is admitted to the bowl in a manner so as not to startle the animals, and in a manner so as to avoid vibration or other distracting conditions.

A further object of the invention is to provide a stock watering bowl which is easy to assemble and disassemble, and wherein the parts may be readily moved to permit thorough cleaning of the interior of the bowl.

A further object of the invention is to provide a stock watering bowl which is of very simple construction, is efficient in operation, is strong and durable, and is well adapted for the purposes described.

With the above and other objects in view, the invention consists of the improved stock watering bowl and its parts and combinations, as set forth in the claim, and all equivalents thereof.

In the accompanying drawing in which the same reference characters indicate the same parts in all of the views:

Fig. 1 is a longitudinal vertical sectional view of the improved stock watering bowl and its associated water supply conduit, taken on line 1—1 of Fig. 2;

Fig. 2 is a plan view of the stock watering bowl;

Fig. 3 is a detail sectional view of the stock watering bowl valve shown in an open position for the maximum admission of water;

Fig. 4 is a similar detail sectional view, but showing the valve in a position to permit only a trickle of water into the bowl; and Fig. 5 is a transverse sectional view taken on line 5—5 of Fig. 2.

In general, the device comprises, in combination with a water supply pipe or conduit and a supporting structure, a bowl, a valve for controlling the supply of water from the conduit to the bowl, and means for regulatably effecting operation of the valve. With respect to the present invention, the specific construction of the valve is very important, as is regulatable means for limiting the movement of the valve operating member.

The bowl 8 is shaped as is conventional in the industry, and is adapted to be mounted in a relatively horizontal position. The neck portion 9 of the bowl terminates in a flange 10 which facilitates the attachment of the bowl to a convenient supporting member (not shown), in any conventional manner. A transverse pin 11 is mounted within the inner end of the neck portion 9 of the bowl and said pin has pivotally mounted thereon the inner end of a lever 12 which extends forwardly and is downwardly curved. The forward end portion of the lever 12 has integral therewith an apertured nose plate 13 which is normally disposed within the bowl 8 as shown, and is adapted to be engaged by the nose of an animal for the purpose of operating the water supply valve to admit water to the bowl, as will hereinafter appear. The undersurface of an intermediate portion of the lever 12 is shaped as is best shown in Fig. 5, forming a channel and overhanging baffles. Said channel-shaped portion of the lever is disposed over, and provides a covering for, the valve controlled outlet end of a water conduit, as will hereinafter appear, and operates to prevent water entering the bowl from splashing or gushing, and directs said water into the enlarged portion of the bowl 8.

A water supply pipe or conduit, connected with a source of water supply under pressure (not shown), is indicated generally by the numeral 14. In the disposition illustrated, said water supply pipe extends upwardly vertically and terminates spacedly below the neck portion 9 of the bowl. The threaded upper extremity of the pipe or conduit 14 is in threaded engagement with the lower end of a valve casing 15. The upper end portion of the valve casing 15 is in threaded engagement with one end of a valve nipple 16, the other end portion of said valve nipple being removably threaded into an internally threaded boss 17 on the underside of the bowl neck 9. The major portion of the valve nipple 16 is formed with a relatively large diameter bore 18 which communicates at its lower end with a bore 19 of considerably reduced diameter, providing at the bottom of the bore 18 an annular shoulder. The upper end of the bore 19 forms a port, as does the lower end of the bore 19, said lower end being tapered as at 20, thereby forming a valve seat and communicating with the interior of the casing 15.

A valve rod 21 extends axially through the valve nipple 16, projecting above the upper end of the latter within the hollow neck portion 9 of the bowl and in alinement with a protuberance 22 on the bottom surface of the lever 12. Loosely mounted on the upper end portion of the valve rod 21 and having a loose sliding engagement with the inner wall of the bore 18 of the nipple member 16 is a shouldered cap 23 closing the upper end of the large diameter bore 18 of the nipple. Said cap has a fluted or apertured periphery 24 to permit the escape of water from the bore 18 into the bowl. A nut 25 is threaded to the outer end portion of the rod 21 and against the cap 23 to restrain upward movement of the cap and to retain the parts in assembled condition. A coiled spring 26 surrounds the rod 21 within the bore 18, and its opposite extremities engage, respectively, the cap 23 and the shouldered lower end of the bore 18.

A portion of the valve rod 21 adjacent the shouldered lower end of the bore 18 is formed with an enlargement 27 which carries a valve washer 28 adapted to control the port at the upper end of the bore 19. Said valve washer is formed with grooves or irregularities 28' which make the valve washer pervious as they permit a trickle of water through the port controlled by the valve washer 28 even when said valve washer is in the seated position of Fig. 4.

The portion of the valve rod 21 which reciprocates within the small diameter bore 19 is formed with an annular fluted guide boss 29 occupying said bore 19, but permitting the flow of water through said bore. A reduced portion of the valve rod 21 spacedly below said guide boss portion 29 carries a tapered valve member 30 adapted, upon upward reciprocation of the valve rod 21, to seat in the tapered port or seat 20. Said valve member 30 is the main shut-off valve and when it is seated, as in Fig. 1, flow of water from the conduit 14, through the nipple 16 and into the bowl, will be prevented. In the normal position of the lever 12 and nose plate 13, the confined coiled spring 26 will hold the valve rod 21 and parts carried thereby in an upwardly reciprocated position, wherein the valve 30 is in its closing position.

Fig. 1 illustrates the parts in the most upwardly urged position of the valve rod 21 which is the normal position when no flow of water into the bowl is desired. The extreme position of the parts in the opposite or downwardly urged position is illustrated in Fig. 4, wherein the nose plate 13 has been depressed so as to urge the valve rod 21 downwardly as far as the adjustments will permit, the depression of the valve rod being accomplished by abutment of the lever protuberance 22 with the projecting upper end of the valve rod. In the extreme downward position of Fig. 4, the main control valve member 30 is unseated with respect to the tapered port 20, allowing the flow of water under pressure from the conduit 14 through the casing 15 and into the small diameter bore 19 of the valve nipple. It will be observed that in the extreme position of Fig. 4, the valve washer 28 is seated in relation to the port at the upper end of the bore 19. This is intended to prevent the flow of anything more than a mere trickle of water into the bore 18 and thence into the bowl 8. The trickle of water through the bore 19 is permitted by virtue of the apertures 28' in the valve washer 28. Consequently, under the condition stated, a small amount of water may be permitted to flow into the bowl 8, and this arrangement is for the purpose of providing for calves or timid animals which might be frightened by a quick and substantial inflow or gush of water which would result from an uncontrolled opening of the valve port 20. A full downward manipulation of the nose plate 13 such as will permit a full downward reciprocation of the valve rod 21 to obtain the controlled valve arrangement of Fig. 4, permitting a mere water trickle, is only possible upon an inward setting of an adjustment screw 31, which is rotatably depended from an under intermediate portion of the valve lever 12. Thus, when the screw 31 is turned outwardly, it is in close proximity to an inner surface portion of the bowl neck against which it will abut upon a slight downward movement of the nose plate 13, restricting movement of the lever 12 and valve rod 21 and its associated parts. When the screw 31 is turned inwardly, it permits of a greater downward depression of the nose plate 13, so that a proper setting of the screw 31 will permit substantial movement of the nose plate and lever 12 with a corresponding complete depression of the valve rod 21 for the purposes stated, and to attain the position of Fig. 4.

The fully open position of the valve is a position midway between the closed position of Fig. 1 and the trickle-permitting position of Fig. 4, said fully open position being illustrated in Fig. 3. There, the valve washer 28 is lifted above the upper end of the bore 19 so as not to interfere with flow through the upper end of said bore, and the main valve 30 is unseated with respect to its tapered port 20. With this position of the parts, a full flow of water under pressure through the bores and nipple and into the bowl is permitted. This arrangement is that which is desired for most animals who will nose the plate 13, and will not be intimidated by a quick and substantial flow of water into the bowl 8. To regulate the parts for the continuous attainment of the valve position of Fig. 3, an outward adjustment of the screw 31 is necessary, which will then permit a downward movement of the nose plate 13 only sufficiently far to cause enough downward reciprocation of the valve rod 21 to obtain said intermediate position, wherein the valves are fully open.

After the stock watering bowl is installed in a barn or stall, the adjustment screw 31 may be regulated to adapt the device to that type of water flow which will best suit the animal using the bowl. Obviously, for different animals, a readjustment can be readily made which will permit anything from a minute trickle of water to a full flow thereof which will quickly fill the bowl. Adjustment of the nut 25 may be made on the valve rod 21 to regulate the tension of the confined coiled spring 26. The mounting of the lever 12 and integral nose plate 13 is such that said plate may be readily swung upwardly to a vertical position to permit cleaning the bowl. The valve parts may be readily assembled and disassembled with respect to each other and with respect to the bowl to facilitate adjustment, repairs, and replacements. The advantages of the controlled flow of water through the valve mechanism and into the bowl has been explained. Additionally, the dual valve arrangement is such that it eliminates vibration which might be caused by the sudden onrush of water, and of course the adjustment screw 31 permits an arrangement of the parts to suit all conditions and to insure the most effective flow of water for the animal served by the bowl. The improved stock watering bowl is furthermore of simple and novel construction, is relatively inexpensive to manufacture, and is well adapted for the purposes described.

What is claimed as the invention is:

In a stock watering bowl assemblage including a bowl and a water supply pipe connected with the bowl, a chambered member in said pipe provided with a pair of axially spaced ports, a main valve controlling one port, an auxiliary valve controlling the other port, said valves being movable in opposite directions to open their respective ports, the auxiliary valve being so constructed that when it is seated with respect to its port it provides a pervious closure to permit the passage of a trickle of fluid, a valve rod spacedly carrying both valves and axially reciprocatably movable relative to the chambered member and ports, a spring for normally holding the valve rod at one limit of its range of movement and for urging it in a direction wherein the main valve is seated relative to its port and the auxiliary valve is removed from its port, and an animal operated lever member movably mounted in the bowl and engageable with the valve rod to move it in a direction opposite to the last described direction to a selected position within certain limits for the establishment of a predetermined positional relationship between both valves and their ports for the control of fluid flow from the pipe into the bowl, the limit of movement of the valve rod caused by the operation of the lever member providing for an unseating of the main valve relative to its port and for the seating of the auxiliary valve relative to its port whereby a trickle of fluid may pass into the bowl, and an intermediate position of the valve rod caused by the operation of the lever member providing for an unseating of both valves relative to their ports to permit a full flow of fluid into the bowl.

HARRY E. BREMER.

REFERENCES CITED

The following references are of record in the file of this patent:

UNITED STATES PATENTS

| Number | Name | Date |
|---|---|---|
| 430,869 | Meyer | June 24, 1890 |
| 474,621 | Andersen | May 10, 1892 |
| 602,074 | Gumtow | Apr. 12, 1898 |
| 1,283,301 | Rassmann | Oct. 29, 1918 |
| 1,584,362 | Fitzgerald | May 11, 1926 |
| 1,743,719 | Louden | Jan. 14, 1930 |
| 1,774,876 | Ferris | Sept. 2, 1930 |

FOREIGN PATENTS

| Number | Country | Date |
|---|---|---|
| 322,591 | Great Britain | Dec. 12, 1929 |
| 327,035 | Great Britain | Mar. 27, 1930 |